US009918323B2

United States Patent
Seo et al.

(10) Patent No.: US 9,918,323 B2
(45) Date of Patent: Mar. 13, 2018

(54) METHOD AND APPARATUS FOR TRANSMITTING AND RECEIVING SIGNAL IN WIRELESS COMMUNICATION SYSTEM

(71) Applicant: LG ELECTRONICS INC., Seoul (KR)

(72) Inventors: Inkwon Seo, Seoul (KR); Hanbyul Seo, Seoul (KR); Seungmin Lee, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 14/778,986

(22) PCT Filed: Apr. 2, 2014

(86) PCT No.: PCT/KR2014/002840
§ 371 (c)(1),
(2) Date: Sep. 21, 2015

(87) PCT Pub. No.: WO2014/163398
PCT Pub. Date: Oct. 9, 2014

(65) Prior Publication Data
US 2016/0057759 A1      Feb. 25, 2016

Related U.S. Application Data

(60) Provisional application No. 61/807,740, filed on Apr. 2, 2013.

(51) Int. Cl.
*H04B 7/185*     (2006.01)
*H04B 7/208*     (2006.01)
(Continued)

(52) U.S. Cl.
CPC ......... *H04W 72/08* (2013.01); *H04W 72/042* (2013.01); *H04W 72/0406* (2013.01); *H04W 72/0453* (2013.01)

(58) Field of Classification Search
CPC .............. H04W 72/08; H04W 72/042; H04W 72/0453; H04W 4/06; H04W 52/143; H04W 52/24; H04W 52/42
See application file for complete search history.

(56) References Cited

U.S. PATENT DOCUMENTS 8,817,769 B2 *  8/2014  Palanki ................. H04W 52/16
                                                              370/329
9,219,994 B2 * 12/2015  Park ........................ H04W 4/06
(Continued)

FOREIGN PATENT DOCUMENTS

CN        102754475        10/2012
WO       2012/045212        4/2012
(Continued)

OTHER PUBLICATIONS

LG Electronics, "Backhaul signaling for ICIC of EPDCCH," 3GPP TSG-RAN WG1 #70, R1-123536, Aug. 2012, 4 pages.
(Continued)

*Primary Examiner* — Hanh N Nguyen
(74) *Attorney, Agent, or Firm* — Lee Hong Degerman Kang Waimey

(57) ABSTRACT

A method for transmitting and receiving a signal in a wireless communication system according to an embodiment of the present invention, comprises the steps of: setting, by a first transmission point, a frequency resource area in at least one subframe; and transmitting information related to the set frequency resource area to a second transmission point, wherein when the first transmission point transmits a physical downlink shared channel (PDSCH) in the set frequency resource area, a ratio of a PDSCH energy per resource element (EPRE) to a cell-specific reference signal (CRS) EPRE in the set frequency resource area is less than a ratio of a PDSCH EPRE to a CRS
(Continued)

(a)

(b)

EPRE in resource areas other than the set frequency resource area.

13 Claims, 11 Drawing Sheets

(51) Int. Cl.
*H04W 72/08* (2009.01)
*H04W 72/04* (2009.01)

(56) References Cited

U.S. PATENT DOCUMENTS

| | | | |
|---|---|---|---|
| 9,277,513 | B2 * | 3/2016 | Kim .................... H04W 52/245 |
| 2011/0170496 | A1 | 7/2011 | Fong et al. |

FOREIGN PATENT DOCUMENTS

| | | |
|---|---|---|
| WO | 2012/126404 | 9/2012 |
| WO | 2013/003218 | 1/2013 |
| WO | 2013036005 | 3/2013 |

OTHER PUBLICATIONS

3rd Generation Partnership Project (3GPP), "Technical Specification Group Radio Access Network; Evolved Universal Terrestrial Radio Access (E-ULTRA); Physical layer procedures (Release 11)," 3GPP TR 36.213 V11.2.0, Feb. 2013, 174 pages.

New Postcom, "Discussion on signalling support for non-zero transmit power ABS," 3GPP TSG-RAN WG1 #68, R1-121121, Mar. 2012, 2 pages.

European Patent Office Application Serial No. 14778077.9, Search Report dated Oct. 13, 2016, 11 pages.

Samsung, "Downlink power allocation for CoMP," 3GPP TSG-RAN WG1 #68bis meeting, R1-121631, Mar. 2012, 4 pages.

PCT International Application No. PCT/KR2014/002840, Written Opinion of the International Searching Authority dated Jul. 17, 2014, 17 pages.

The State Intellectual Property Office of the People's Republic of China Application Serial No. 201480019634.X, Office Action dated Sep. 29, 2017, 7 pages.

* cited by examiner

FIG. 6
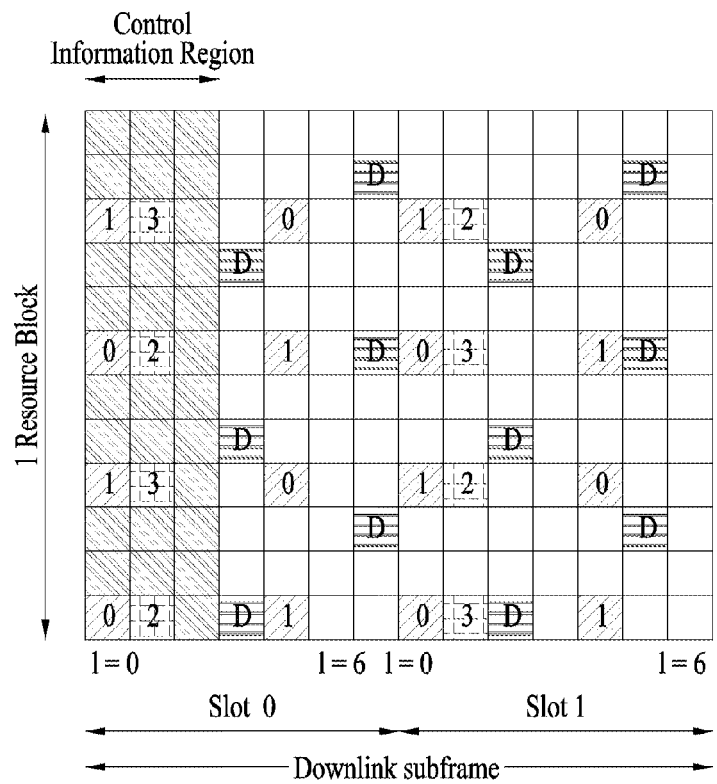
(a)
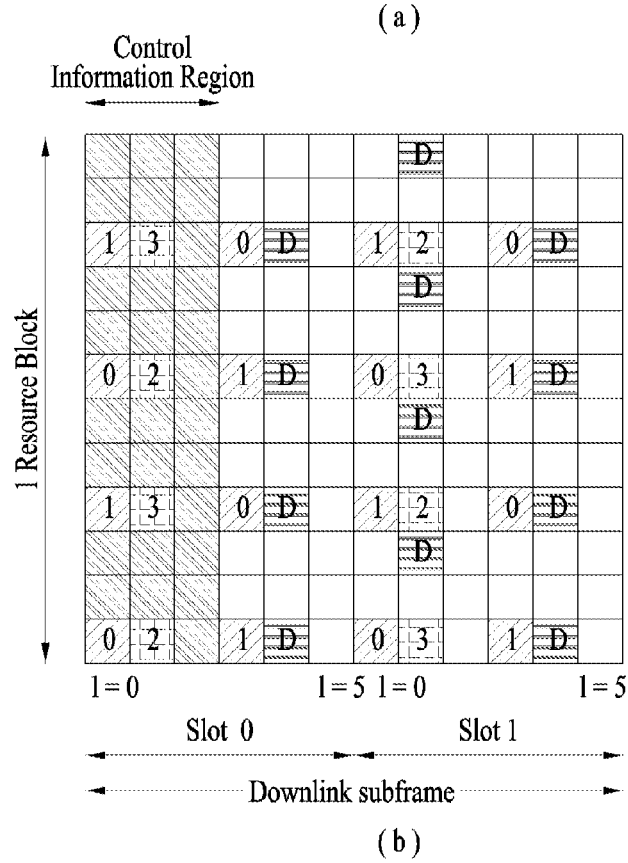
(b)

FIG. 8

METHOD AND APPARATUS FOR TRANSMITTING AND RECEIVING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2014/002840, filed on Apr. 2, 2014, which claims the benefit of U.S. Provisional Application No. 61/807,740, filed on Apr. 2, 2013, the contents of which are all hereby incorporated by reference herein in their entirety.

TECHNICAL FIELD

The present disclosure relates to a wireless communication system and, more particularly, to a method and apparatus for configuring resources for an enhanced physical downlink control channel (EPDCCH) between a plurality of transmission points.

BACKGROUND ART

Wireless communication systems are widely deployed to provide various kinds of communication services such as voice and data services. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE

Technical Problem

An object of the present invention is to provide to provide resource configuration for an EPDCCH of different transmission points.

It is to be understood that technical objects to be achieved by the present invention are not limited to the aforementioned technical object and other technical objects which are not mentioned herein will be apparent from the following description to one of ordinary skill in the art to which the present invention pertains.

Technical Solution

The object of the present invention can be achieved by providing a method for transmitting and receiving a signal in a wireless communication system, including configuring, by a first transmission point, a frequency resource region in at least one subframe, and transmitting, to a second transmission point, information related to the configured frequency resource region, wherein, when the first transmission point transmits a Physical Downlink Shared Channel (PDSCH) in the frequency resource region, a PDSCH EPRE (Energy Per Resource Element)-to-CRS (Cell-specific reference signal) EPRE ratio used in the frequency resource region is less than a PDSCH EPRE-to-CRS EPRE ratio in a resource region other than the frequency resource region.

According to another aspect of the present invention, provided herein is a first transmission point in a wireless communication system, including a reception module, and a processor, wherein the processor is configured to configure a frequency resource region in at least one subframe and to transmit, to a second transmission point, information related to the configured frequency resource region, wherein, when a Physical Downlink Shared Channel (PDSCH) is transmitted in the frequency resource region, a PDSCH EPRE (Energy Per Resource Element)-to-CRS (Cell-specific reference signal) EPRE ratio used in the frequency resource region is less than a PDSCH EPRE-to-CRS EPRE ratio in a resource region other than the frequency resource region.

The aspects of the present invention may include the following details.

At least one part of the frequency resource region may be used for transmission of an Enhanced Physical Downlink Control Channel (EPDCCH) from the second transmission point.

The EPDCCH from the second transmission point may be intended for at least one of terminals neighboring cell edges of the first transmission point and the second transmission point.

The frequency resource region may be nulled by the first transmission point.

The frequency resource region may be allocated to a terminal spaced from a cell edge of the second transmission point by a distance greater than or equal to a predetermined distance.

The at least one subframe may be indicated by information received from the second transmission point.

The information related to the frequency resource region may include valid period information of the configured frequency resource region.

The second transmission point may allocate an Enhanced Physical Downlink Control Channel (EPDCCH) to the frequency resource region within a valid period.

The method may further include receiving, from the second transmission point, information on a part of the frequency resource region to be used for an Enhanced Physical Downlink Control Channel (EPDCCH).

When the first transmission point and the second transmission point are included in a Coordinated Multi-Point (CoMP) cluster, the second transmission point may configure a frequency resource region for a third transmission point.

When the second transmission point transmits a PDSCH in the frequency resource region for the third transmission point, a PDSCH EPRE-to-CRS EPRE ratio used in the frequency resource region for the third transmission point may be less than a PDSCH EPRE-to-CRS EPRE ratio in a resource region other than the frequency resource region.

The information related to the frequency resource region configured by the first transmission point and information related to the frequency resource region configured by the second transmission point may be signaled to a terminal belonging to the CoMP cluster.

The frequency resource region may be configured in a PRB pair unit.

Advantageous Effects

According to an embodiment of the present invention, interference caused by EPDCCH transmission may be reduced.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 6 illustrates a reference signal;

FIG. 8 illustrates EREG-to-ECCE mapping;

BEST MODE

Figure 1:
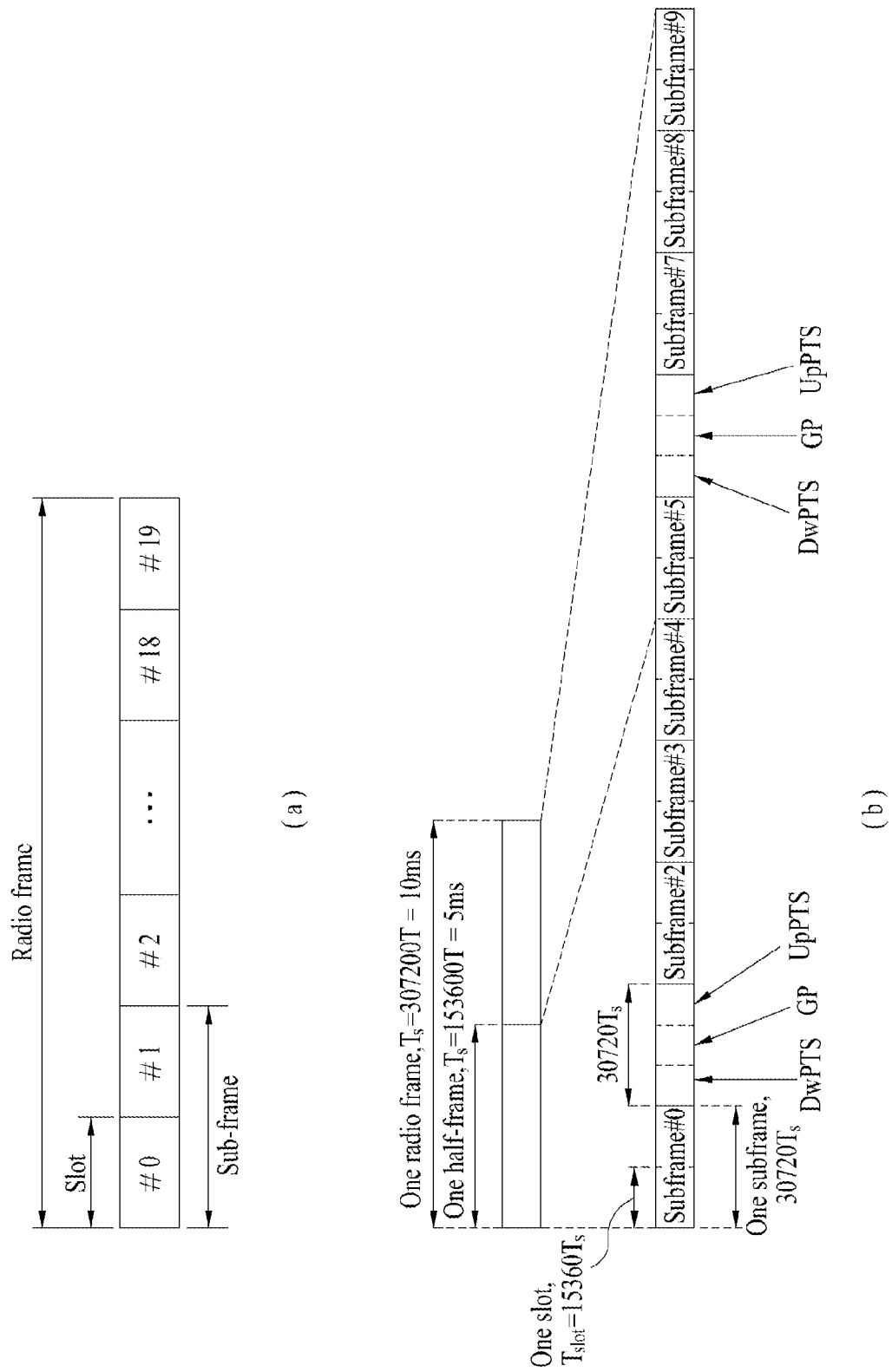
FIG. 1 illustrates a radio frame structure.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station and a user equipment. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. At this time, the 'base station' (BS) may be replaced with terminologies such as a fixed station, Node B, eNode B (eNB), and an access point (AP). Also, terminal may be replaced with terminologies such as a user equipment (UE), a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE. For clarification of the description, although the present invention will be described based on the 3GPP LTE/LTE-A, it is to be understood that technical spirits of the present invention are not limited to the 3GPP LTE/LTE-A.

LTE/LTE-A Resource Structure/Channel

FIG. 1 is a diagram illustrating a structure of a radio frame.

In a cellular OFDM communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 1(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) is a resource allocation unit and may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of the subframe may be allocated to a physical downlink control channel (PDCCH), and the other OFDM symbols may be allocated to a physical downlink shared channel (PDSCH).

FIG. 1(b) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One subframe includes two slots. The DwPTS is used for initial cell search, synchronization or channel estimation at the user equipment. The UpPTS is used for channel estimation at the base station and uplink transmission synchronization of the user equipment. Also, the guard period is to remove interference occurring in the uplink due to multipath delay of downlink signals between the uplink and the downlink. Meanwhile, one subframe includes two slots regardless of the type of the radio frame.

The structure of the radio frame is only exemplary, and various modifications may be made in the number of subframes included in the radio frame, the number of slots included in the subframe, or the number of symbols included in the slot.

Figure 2:
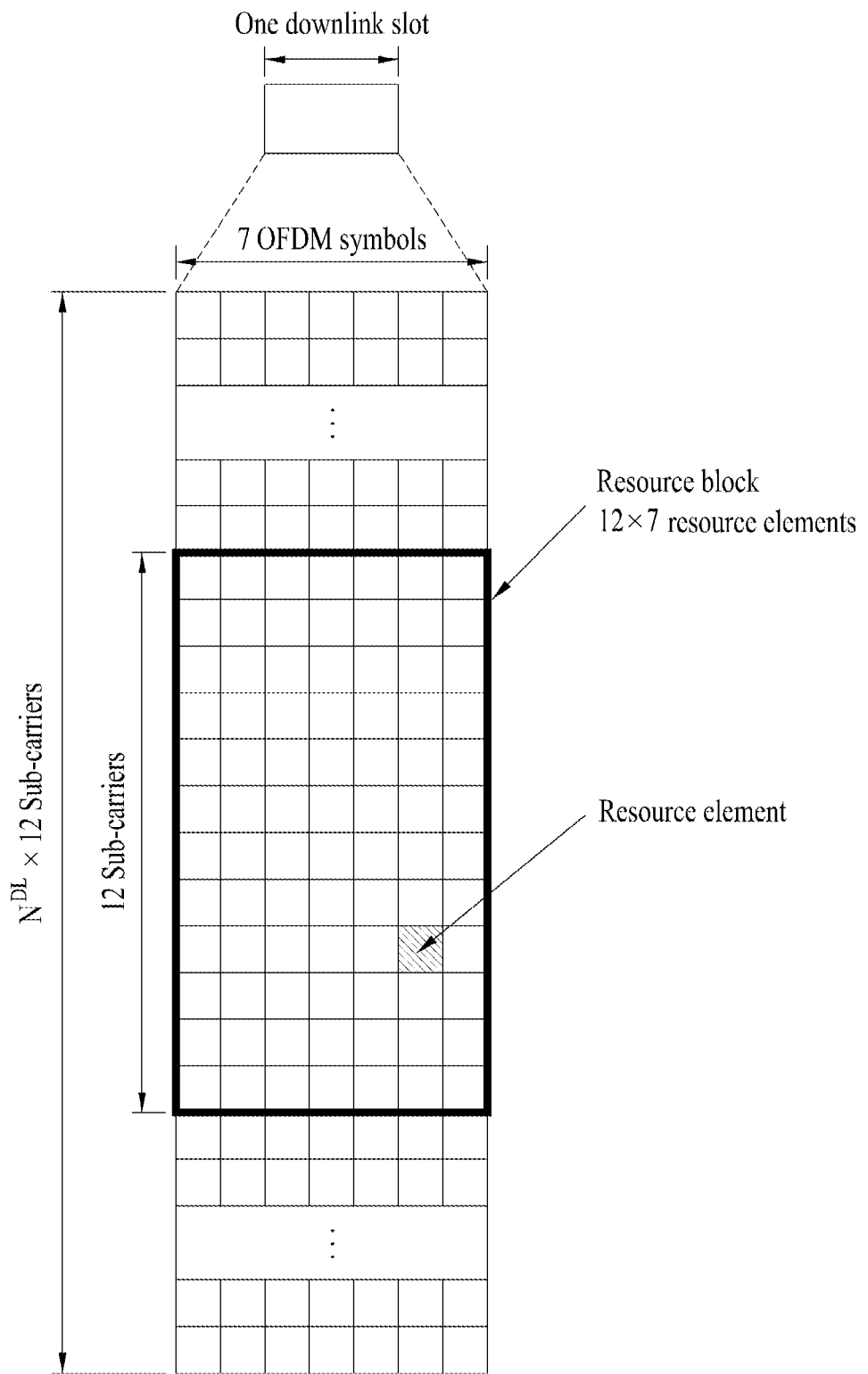
FIG. 2 is a diagram illustrating a resource grid for one downlink (DL) slot.

FIG. 2 is a diagram illustrating a resource grid at a downlink slot. One downlink slot includes, but not limited to, seven OFDM symbols in a time domain, and one resource block (RB) includes, but not limited to, twelve subcarriers in a frequency domain. For example, although one slot includes seven OFDM symbols in case of the normal CP, one slot may include six OFDM symbols in case of the extended CP. Each element on the resource grid will be referred to as a resource element (RE). One resource block (RB) includes 12×7(6) resource elements. The number $N^{DL}$ of resource blocks (RBs) included in the downlink slot depends on a downlink transmission bandwidth. A structure of an uplink slot may be the same as that of the downlink slot.

Figure 3:
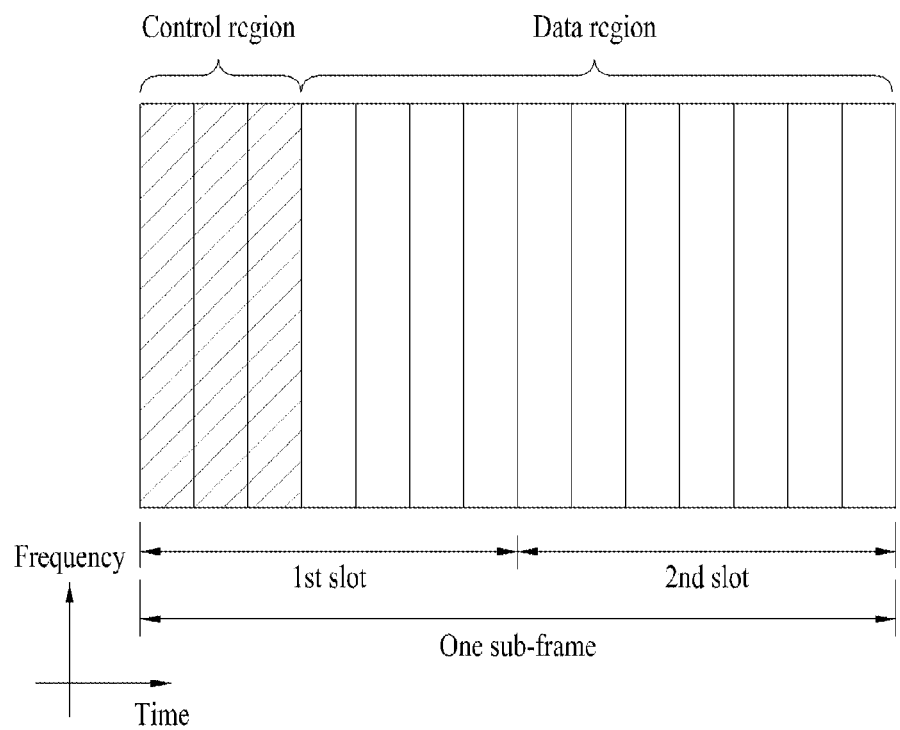
FIG. 3 is a diagram illustrating a DL subframe structure.

FIG. 3 is a diagram illustrating a structure of a downlink subframe. Maximum three OFDM symbols located at the front of the first slot within the subframe correspond to a control region to which a control channel is allocated. The other OFDM symbols correspond to a data region to which a physical downlink shared channel (PDSCH) is allocated. Examples of the downlink control channel used in the 3GPP LTE system include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and includes information on the number of OFDM symbols used for transmission of the control channel within the subframe. The PHICH is a response to uplink transmission, and includes HARQ ACK/NACK (acknowledgement/negative-acknowledgement) signal. The control information transmitted through the PDCCH will be referred to as downlink control information (DCI). The DCI includes uplink or downlink scheduling information or uplink transmission (Tx) power control command for a random user equipment group. The PDCCH includes transport format and resource allocation information of a downlink shared channel (DL-SCH), resource allocation information of an uplink shared channel (UL-SCH), paging information of a paging channel (PCH), system information on the DL-SCH, resource allocation information of an upper layer control message such as a random access response transmitted onto the PDSCH, a set of transmission power control command of an individual user equipment within a random user equipment group, transmission power control information, and activation of voice over Internet protocol (VoIP). A plurality of PDCCHs may be transmitted within the control region. The user equipment may monitor the plurality of PDCCHs. The PDCCH is transmitted by aggregation of one or more continuous control channel elements (CCEs). The CCE is a logic allocation unit used to provide a PDCCH at a predetermined coding rate based on the status of a radio channel. The CCE corresponds to a plurality of resource element groups (REGs). The format of the PDCCH and the number of available bits of the PDCCH are determined depending on the correlation between the number of CCEs and the coding rate provided by the CCE. The base station determines a PDCCH format depending on the DCI transmitted to the user equipment, and attaches cyclic redundancy check (CRC) to the control information. The CRC is masked with a radio network temporary identifier (RNTI) depending on owner or usage of the PDCCH. For example, if the PDCCH is for a specific user equipment, the CRC may be masked with cell-RNTI (C-RNTI) of the corresponding user equipment. If the PDCCH is for a paging message, the CRC may be masked with a paging indicator identifier (P-RNTI). If the PDCCH is for system information (in more detail, system information block (SIB)), the CRC may be masked with system information identifier and system information RNTI (SI-RNTI). The CRC may be masked with a random access RNTI (RA-RNTI) to indicate a random access response that is a response to transmission of a random access preamble of the user equipment.

Figure 4:
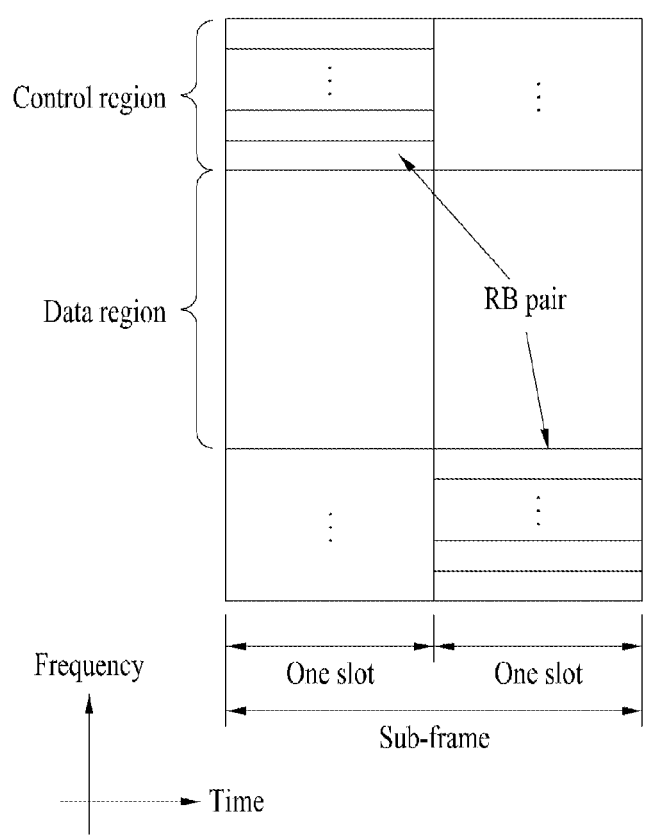
FIG. 4 is a diagram illustrating an uplink (UL) subframe structure.

FIG. 4 is a diagram illustrating a structure of an uplink subframe. The uplink subframe may be divided into a control region and a data region on a frequency domain. A physical uplink control channel (PUCCH) which includes uplink control information is allocated to the control region. A physical uplink shared channel (PUSCH) which includes user data is allocated to the data region. In order to maintain single carrier features, one user equipment does not transmit the PUCCH and the PUSCH at the same time. The PUCCH for one user equipment is allocated to resource block (RB) pair for the subframe. Resource blocks (RBs) belonging to the RB pair reserve different subcarriers for two slots. The RB pair allocated to the PUCCH is subjected to frequency hopping at a slot boundary.

DCI Format

According to the current LTE-A (release 10), DCI formats 0, 1, 1A, 1B, 1C, 1D, 2, 2A, 2B, 2C, 3, 3A and 4 are defined. In this case, the DCI formats 0, 1A, 3 and 3A are defined to have the same message size as one another to reduce the number of blind decoding times, wherein blind decoding will be described later. These DCI formats may be divided into i) DCI formats 0 and 4 used for uplink grant, ii) DCI formats 1, 1A, 1B, 1C, 1D, 2, 2A, 2B and 2C used for downlink scheduling allocation, and iii) DCI formats 3 and 3A used for power control command depending on usage of control information to be transmitted.

The DCI format 0 used for uplink grant may include carrier offset (carrier indicator) required in respect of carrier aggregation, which will be described later, offset (flag for format 0/format 1A differentiation) used to identify the DCI format 0 from the DCI format 1A, a frequency hopping flag notifying whether frequency hopping is used for uplink PUSCH transmission, information on resource block assignment to be used for PUSCH transmission by the user equipment, a modulation and coding scheme, a new data indicator used to empty a buffer to perform initial transmission in respect of HARQ process, a transmission power control (TPC) command for scheduled for PUSCH, cyclic shift for demodulation reference signal (DMRS) and OCC index, uplink (UL) index required for TDD operation, and request of channel quality information (CQI). Meanwhile, since synchronous HARQ is used for the DCI format 0, the DCI format 0 does not include redundancy version unlike the DCI formats related to downlink scheduling allocation. The carrier indicator is not included in the DCI format if cross carrier scheduling is not used.

The DCI format 4 is newly added in the LTE-A release 10, and is to support application of spatial multiplexing to uplink transmission in the LTE-A. Since the DCI format 4 further includes information for spatial multiplexing as compared with the DCI format 0, the DCI format 4 has a greater message size, and further includes additional control information in addition to the control information included in the DCI format 0. In other words, the DCI format 4 further includes a modulation and coding scheme for a second transport block, precoding information for multi-antenna transmission, and sounding reference signal (SRS) request information. Meanwhile, since the DCI format 4 has a size greater than that of the DCI format 0, the DCI format 4 does not include offset for identifying the DCI format 0 from the DCI format 1A.

The DCI formats 1, 1A, 1B, 1C, 1D, 2, 2A, 2B and 2C used for downlink scheduling allocation may be divided into the DCI formats 1, 1A, 1B, 1C and 1D, which do not support spatial multiplexing, and the DCI formats 2, 2A, 2B and 2C, which support spatial multiplexing.

The DCI format 1C supports frequency continuous allocation only as compact downlink allocation, and does not include carrier offset and redundancy version as compared with the other formats.

The DCI format 1A is the format for downlink scheduling and random access process. The DCI format 1A may include carrier offset, an indicator indicating whether downlink distributive transmission is used, PDSCH resource allocation information, a modulation and coding scheme, redundancy version, HARQ process number for indicating a processor used for soft combining, new data offset used to empty a buffer for initial transmission in respect of HARQ process, a transmission power control command for PUCCH, and an uplink index required for TDD operation.

Control information of the DCI format 1 is mostly similar to that of the DCI format 1A. However, the DCI format 1A is related to continuous resource allocation, whereas the DCI format 1 supports discontinuous resource allocation. Accordingly, since the DCI format 1 further includes a resource allocation header, control signaling overhead is increased as trade-off of increase of flexibility in resource allocation.

As compared with the DCI format 1, the DCI formats 1B and 1D are common for each other in that the DCI formats 1B and 1D further include precoding information. The DCI format 1B includes PMI confirmation information, and the DCI format 1D includes downlink power offset information. The other control information included in the DCI formats 1B and 1D mostly corresponds to that of the DCI format 1A.

The DCI formats 2, 2A, 2B and 2C basically include most of the control information included in the DCI format 1A, and further includes information for spatial multiplexing. In this case, the information for spatial multiplexing include a modulation and coding scheme related to the second transport block, new data offset, and redundancy version.

The DCI format 2 supports closed-loop spatial multiplexing, the DCI format 2A supports open-loop spatial multiplexing. Both the DCI formats 2 and 2A include precoding information. The DCI format 2B supports dual layer spatial multiplexing combined with beamforming, and further includes cyclic shift information for DMRS. The DCI format 2C may be understood as extension of the DCI format 2B, and supports spatial multiplexing to reach eight layers.

The DCI formats 3 and 3A may be used to complement transmission power control information included in the aforementioned DCI formats for uplink grant and downlink scheduling allocation, that is, support semi-persistent scheduling. A command of 1 bit per user equipment is used in case of the DCI format 3, and a command of 2 bits per user equipment is used in case of the DCI format 3A.

Any one of the aforementioned DCI formats is transmitted through one PDCCH, and a plurality of PDCCHs may be transmitted within the control region. The user equipment may monitor the plurality of PDCCHs.

PDCCH Processing

A control channel element (CCE) which is a logic allocation unit is used when the PDCCH is mapped into REs. One CCE includes a plurality of resource element groups (REGs) (for example, nine REGs), each of which includes four neighboring REs excluding a reference signal (RS).

The number of CCEs required for a specific PDCCH is varied depending on DCI payload which is a size of control information, a cell bandwidth, a channel coding rate, etc. In more detail, the number of CCEs for a specific PDCCH may be defined in accordance with a PDCCH format as illustrated in Table 1 below.

TABLE 1

| PDCCH format | Number of CCEs | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Any one of four formats may be used for the PDCCH as described above, and is not notified to the user equipment. Accordingly, the user equipment should perform decoding without knowing the PDCCH format. In this case, decoding will be referred to as blind decoding. However, if the user equipment performs decoding of all the CCEs used for the downlink for each PDCCH format, it may cause great load. Accordingly, a search space is defined considering restriction of a scheduler and the number of decoding try times.

In other words, the search space is a set of candidate PDCCHs comprised of CCEs that should be decoded by the user equipment on an aggregation level. In this case, the aggregation level and the number of PDCCH candidates may be defined as illustrated in Table 2 below.

TABLE 2

| | Search space | | The number of |
|---|---|---|---|
| | Aggregation level | Size (CCE unit) | PDCCH candidates |
| User equipment-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As will be aware of it from Table 2 above, since four aggregation levels exist, the user equipment has a plurality of search spaces in accordance with each aggregation level. Also, as illustrated in Table 2, the search space may be divided into a user equipment specific search space and a common search space. The user equipment specific search space is intended for specific user equipments, each of which may acquire control information if RNTI and CRC masked in the PDCCH are valid by monitoring (trying decoding for a set of the PDCCH candidates in accordance with an available DCI format) the user equipment specific search space and checking the RNTI and the CRC.

The common search space is intended for dynamic scheduling for system information or paging message, and is used if a plurality of user equipments or all the user equipments should receive the PDCCH. However, the common search space may be used for a specific user equipment in view of resource management. Also, the common search space may be overlapped with the user equipment specific search space.

The search space may be determined specifically by the following Equation 1.

$$L\{(Y_k+m') \bmod \lfloor N_{CCE,k}/L \rfloor\}+i \qquad \text{Equation 1}$$

In this case, L is an aggregation level, $Y_k$ is a factor determined by RNTI and subframe number k, m' is the number of PDCCH candidates, is equal to $m+M^{(L)} \cdot n_{CI}$ if carrier aggregation is used and is equal to m (m'=m (m=0, ..., $M^{(L)}-1$)) if not so, $M^{(L)}$ is the number of PDCCH candidates, $N_{CCE,K}$ is a total number of CCEs of a control region at the kth subframe, and i is a factor that designates an individual CCE from each PDCCH candidate of the PDCCH (i=0, ..., L−1). In case of the common search space, $Y_k$ is always determined as 0.

Figure 5:
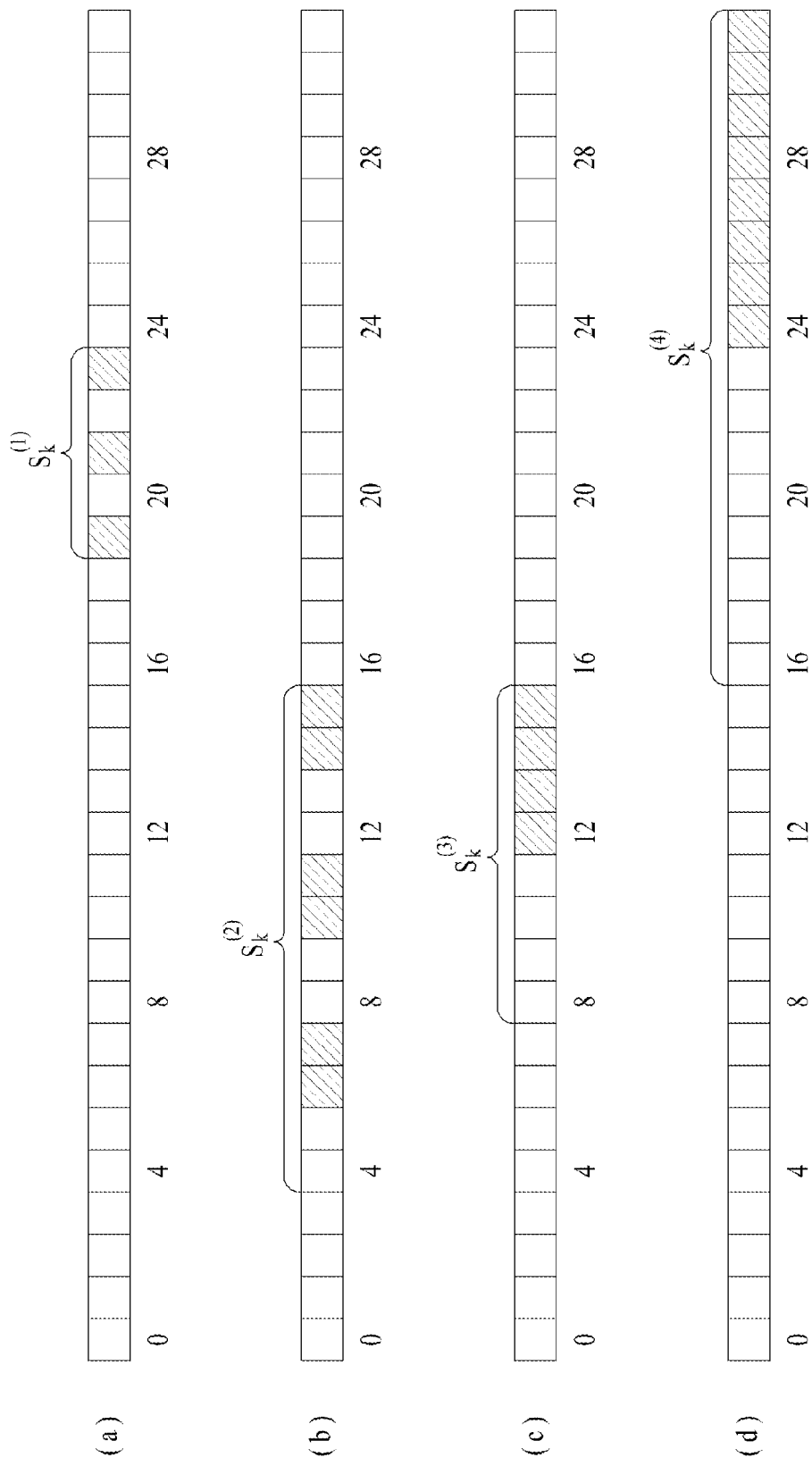
FIG. 5 illustrates a search space.

FIG. 5 illustrates a user equipment specific search space (shaded portion) at each aggregation level that may be defined in accordance with the above Equation 1. In this case, carrier aggregation is not used, and the number of $N_{CCE,k}$ is 32 for convenience of description.

FIGS. 5(a), 5(b), 5(c) and 5(d) respectively illustrate aggregation levels of 1, 2, 4 and 8, wherein numbers represent CCE numbers. In FIG. 5, a start CCE of the search space at each aggregation level is determined by RNTI and subframe number k as described above, and may be determined differently for each aggregation level due to a modulo function and L within the same subframe for one user equipment and is determined as a multiple only of the aggregation level due to L. In this case, $Y_k$ is exemplarily assumed as CCE number 18. The user equipment sequentially tries decoding for CCEs determined in accordance with the corresponding aggregation level by starting from the start CCE. For example, in (b) of FIG. 5, the user equipment tries decoding for the CCEs in a unit of two CCEs in accordance with the aggregation level by starting from the CCE number 4 which is the start CCE.

As described above, the user equipment tries decoding for the search space, wherein the number of decoding try times is determined by a transmission mode which is determined through the DCI format and RRC signaling. If carrier aggregation is not used, since the user equipment should consider two types of DCI sizes (DCI format 0/1A/3/3A and DCI format 1C) for each of six PDCCH candidates in case of the common search space, the number of decoding try times corresponding to maximum 12 times will be required. In case of the user equipment specific search space, since the user equipment considers two types of DCI sizes for the number of PDCCH candidates (6+6+2+2=16), the number of decoding try times corresponding to maximum 32 times will be required. Accordingly, if carrier aggregation is not used, the number of decoding try times corresponding to maximum 44 times will be required.

Meanwhile, if carrier aggregation is used, since decoding for the user equipment specific search space and the DCI format 4 is additionally performed as much as the number of downlink resources (component carriers), the maximum number of decoding times will be more increased.

Reference Signal (RS)

In the wireless communication system, since a packet is transmitted through a radio channel, signal distortion may occur during transmission of the packet. In order to normally receive the distorted signal in a receiving side, distortion of the received signal should be compensated using channel information. In order to discover the channel information, it is required to transmit the signal known by both a transmitting side and the receiving side and discover the channel information using a distortion level of the signal when the signal is transmitted through the channel. In this case, the signal known by both the transmitting side and the receiving side will be referred to as a pilot signal or a reference signal.

In case that multiple antennas are used to transmit and receive data, a channel status between each transmitting antenna and each receiving antenna should be known to receive a normal signal. Accordingly, a separate reference signal should exist per transmitting antenna, in more detail, per antenna port.

The reference signal may be divided into an uplink reference signal and a downlink reference signal. In the current LTE system, the uplink reference signal may include:

i) a demodulation reference signal (DM-RS) for channel estimation for coherent demodulation of information transmitted through the PUSCH and the PUCCH; and ii) a sounding reference signal (SRS) for allowing a base station to measure uplink channel quality at frequencies of different networks.

Meanwhile, the downlink reference signal may include:

i) a cell-specific reference signal (CRS) shared among all the user equipments within the cell;

ii) a user equipment (UE)-specific reference signal for a specific user equipment only;

iii) a demodulation reference signal (DM-RS) for coherent demodulation if the PDSCH is transmitted;

iv) channel state information-reference signal (CSI-RS) for transferring channel state information (CSI) if a downlink DMRS is transmitted;

v) a multimedia broadcast single frequency network (MBSFN) reference signal transmitted for coherent demodulation for a signal transmitted in an MBSFN mode; and v) a positioning reference signal used to estimate geographic position information of the user equipment.

The reference signal may be divided into two types in accordance with its purpose. Namely, examples of the reference signal include a reference signal used for acquisition of channel information and a reference signal used for data demodulation. Since the former reference signal is intended for acquisition of channel information on the downlink through the user equipment, it needs to be transmitted through a wideband. Also, the former reference signal should be received even by a user equipment that does not receive downlink data for a specific subframe. Also, this reference signal for acquisition of channel information may be used even in case of handover status. The latter reference signal is transmitted from the base station together with a corresponding resource when the base station transmits downlink data. In this case, the user equipment may perform channel measurement by receiving the corresponding reference signal, whereby the user equipment may demodulate the data. This reference signal for data demodulation should be transmitted to a region to which data are transmitted.

The CRS is used for both acquisition of channel information and data demodulation. The user equipment-specific reference signal is used for data demodulation only. The CRS is transmitted per subframe through a wideband. The reference signal for maximum four antenna ports is transmitted depending on the number of transmitting antennas of the base station.

For example, if the number of transmitting antennas of the base station is two, the CRS for the antenna ports 0 and 1 are transmitted. If the number of transmitting antennas is four, the CRS for the antenna ports 0 to 3 are respectively transmitted.

FIG. 6 is a diagram illustrating that CRS and DRS defined in the existing 3GPP LTE system (for example, release-8) are mapped onto a pair of downlink resource blocks (RBs). A pair of downlink resource blocks (RBs) may be expressed by one subframe on a time domain×twelve subcarriers on a frequency domain as a mapping unit of the reference signal. In other words, a pair of resource blocks on a time axis have a length of 14 OFDM symbols in case of normal cyclic prefix (CP) (FIG. 6(a)) and has a length of 12 OFDM symbols in case of extended cyclic prefix (CP) (FIG. 6(b)).

FIG. 6 illustrates a position of a reference signal on a pair of resource blocks in a system that a base station supports four transmitting antennas. In FIG. 6, resource elements (REs) marked with '0', '1', '2' and '3' represent position of the CRS for each of antenna ports '0', '1', '2' and '3'. Meanwhile, resource elements marked with 'D' represent the position of the DMRS.

Coordinated Multi-Point (CoMP)

To satisfy enhanced system performance requirements for the 3GPP LTE-A system, CoMP transmission and reception technology (also called co-MIMO, collaborative MIMO or network MIMO) has been proposed. The CoMP technology may increase performance of UEs located at a cell edge and average sector throughput.

In a multi-cell environment with a frequency reuse factor set to 1, the performance of a UE located at a cell edge and average sector throughput may be lowered due to inter-cell interference (ICI). To attenuate ICI, the legacy LTE/LTE-A system has adopted a simple passive technique such as fractional frequency reuse (FFR) based on UE-specific power control such that a UE located at a cell edge may have appropriate throughput performance in an environment constrained by interference. However, attenuating the ICI or reusing ICI as a desired signal for the UE may be more desirable than using fewer frequency resources per cell. To this end, a CoMP transmission technique may be employed.

CoMP schemes applicable to downlink may be broadly classified into joint processing (JP) and coordinated scheduling/beamforming (CS/CB).

According to the JP scheme, data may be used by each transmission point (eNB) of a CoMP cooperation unit. The CoMP cooperation unit refers to a set of eNBs used for a CoMP transmission scheme. The JP scheme may be further divided into joint transmission and dynamic cell selection.

Joint transmission refers to a technique of simultaneously transmitting PDSCHs from a plurality of transmission points (a part or the entirety of a CoMP cooperation unit). That is, a plurality of transmission points may simultaneously transmit data to a single UE. With the joint transmission scheme, the quality of a received signal may be coherently or non-coherently improved, and interference with other UEs may be actively eliminated.

Dynamic cell selection is a technique of transmitting a PDSCH from one transmission point (of a CoMP cooperation unit) at a time. That is, one transmission point transmits data to a single UE at a specific time, while the other transmission points in the CoMP cooperation unit do not transmit data to the UE at the specific time. A transmission point to transmit data to the UE may be dynamically selected.

Meanwhile, in the CS/CB scheme, CoMP cooperation units may cooperatively perform beamforming for data transmission to a single UE. While data is transmitted to the UE only from a serving cell, user scheduling/beamforming may be determined through coordination among cells of the CoMP cooperation unit.

In the case of uplink, CoMP reception refers to reception of a signal transmitted through coordination among a plurality of geographically separated transmission points. CoMP schemes applicable to uplink may be classified into joint reception (JR) and coordinated scheduling/beamforming (CS/CB).

The JR scheme indicates that a plurality of transmission points receives a signal transmitted over a PUSCH. The CS/CB scheme indicates that the PUSCH is received by only one transmission point, while user scheduling/beamforming is determined by coordination among the cells of the CoMP cooperation unit.

With a CoMP system as above, multi-cell base stations may jointly support data for a UE. In addition, the base stations may simultaneously support one or more UEs using the same radio frequency resource, thereby improving system performance. Moreover, a base station may perform space division multiple access (SDMA) based on CSI between the UE and the base station.

In the CoMP system, a serving eNB and one or more cooperative eNBs are connected to a scheduler over a backbone network. The scheduler may operate by receiving channel information about channel states between each UE and cooperative eNBs measured and fed back by the cooperative eNBs over the backbone network, and operate based on the channel information. For example, the scheduler may schedule information for a cooperative MIMO operation for the serving eNB and the one or more cooperative eNBs. That is, the scheduler may directly issue an instruction for the cooperative MIMO operation to each eNB.

As described above, it can be said that the CoMP system operates as a virtual MIMO system by grouping a plurality of cells into one group. Basically, a MIMO communication scheme employing multiple antennas may be adopted.

Figure 7:
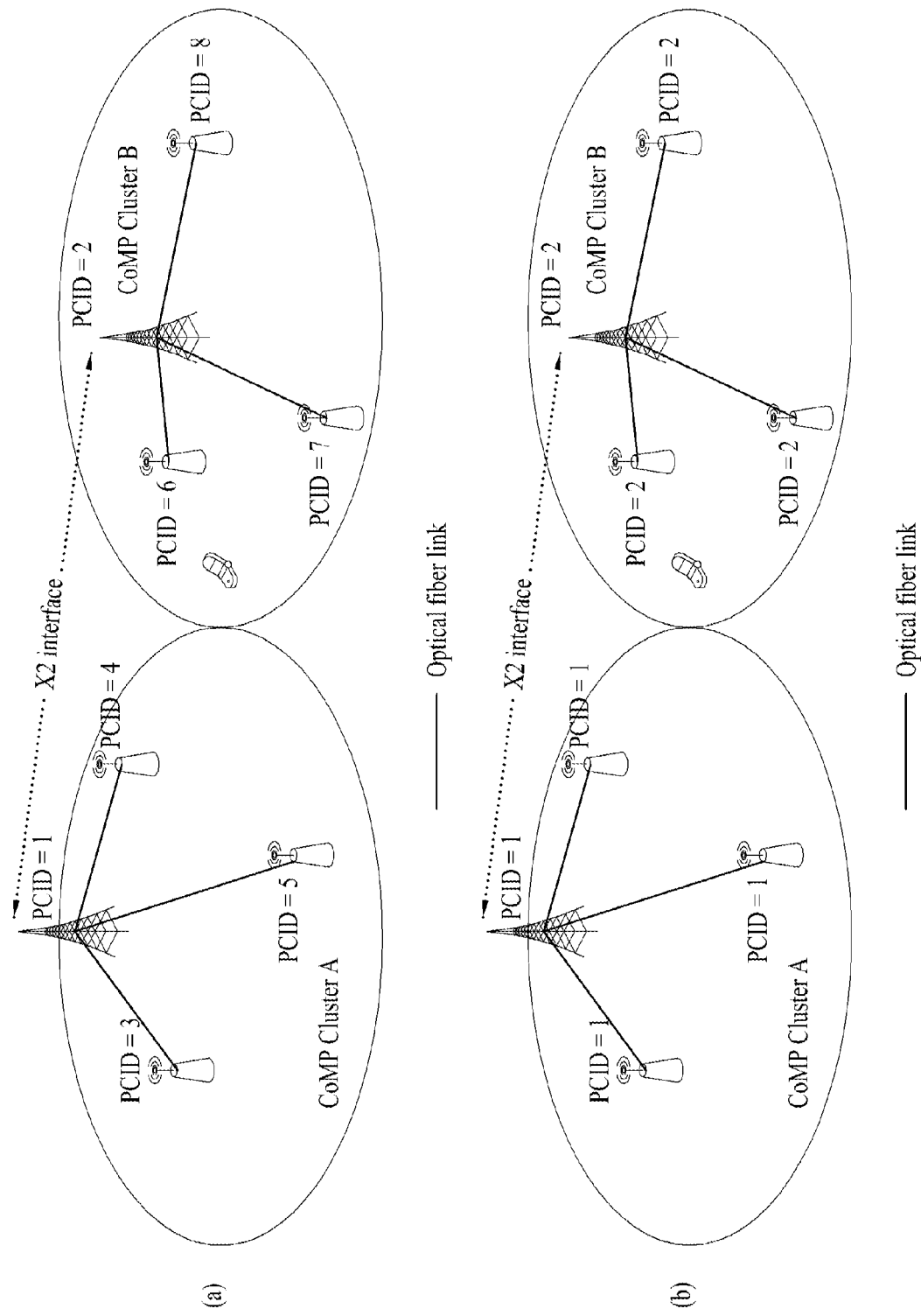
FIG. 7 illustrates a coordinated multi-point cluster.

A CoMP cluster is a set of cells which are capable of performing CoMP operations, namely, cooperative scheduling and cooperative data transmission/reception. For example, cells in a single cluster may be assigned different physical cell IDs (PCIDs) as shown in FIG. 7(a), or may share the same PCID such that the cells may be configured in the form of a distributed antenna or RRH of a single eNB as shown in FIG. 7(b). In modified examples of FIG. 7, some cells in the single cluster may share the same PCID.

Generally, cells in a CoMP cluster are interconnected through a backhaul link, such as an optical fiber having high capacity and low latency, and thus cooperative scheduling and cooperative data transmission/reception are possible for the cells. In addition, the cells are maintained in an exactly time-synchronized state, thereby enabling cooperative data transmission. Further, in receiving signals from cells of the CoMP cluster participating in cooperative transmission, CoMP cluster size needs to be determined such that a difference in reception time between signals transmitted from the respective cells, which is caused by a propagation delay difference between respective cells, is within the range of a cyclic prefix (CP) length of an OFDM symbol. In contrast, cells belonging to different clusters may be interconnected through a lower-capacity backhaul link, and time synchronization therebetween may not be maintained.

A UE configured to perform CoMP performs cooperative scheduling and cooperative data transmission/reception by some or all of cells belonging to a CoMP cluster, and measures reference signals transmitted from some or all cells of the CoMP cluster according to qualities of signals received by the UE. In order to measure performances of a link between a UE and each cell, the UE measures a reference signal of each cell and reports the signal quality. In particular, cells which the UE needs to measure may be defined as a CoMP measurement set.

For CoMP, it is necessary to define a reference resource set for which the UE should measure and report a channel. This is because the CoMP scheme and downlink scheduling and the like for the UE are determined according to channel information per cell which the UE reports on uplink. Information indicating that the UE must measure/report a signal from a certain cell, namely a CoMP measurement set should be transferred through higher layer signaling. This information may be signaled as a CSI-RS resource.

Downlink Power Allocation

Hereinafter, downlink power allocation in the LTE/LTE-A system will be discussed.

An eNB may determine downlink transmit power per RE. A UE assumes that a specific CRS energy per resource element (CRS EPRE) is constant in the downlink system bandwidth and all subframes until other cell-specific RS power information is received. The CRS EPRE may be derived from an RS transmit power given by referenceSignalPower, which is a parameter provided from a higher layer. The downlink RS transmit power may be defined as a linear average of power proportions of all REs on which CRS within the system frequency is transmitted.

Subsequently, the power of an RE by which PDSCH is transmitted may be determined based on the CRS EPRE. Ratios of PDSCH EPRE to CRS EPRE, i.e., $\rho_A$ and $\rho_B$ are defined for respective OFDM symbols. $\rho_A$ is a ratio of PDSCH EPRE to CRS EPRE on an OFDM symbol on which CRS is not present, and $\rho_B$ is a ratio of PDSCH EPRE to CRS EPRE on an OFDM symbol on which CRS is present.

The UE may know $\rho_A$ and $\rho_B$ from transmit power-related parameters $P_A$ and $P_B$, which are received through higher layer signaling. More specifically, $\rho_A$ is related to $P_A$ by Equation 2 given below, and thus the UE may estimate $P_A$ from the signaled value of $P_A$.

$$\rho_A = P_A [\text{dB}]$$

$$\rho_A = \text{power-offset} + P_A [\text{dB}]$$

$$\rho_A = \text{power-offset} + P_A + 10 \log_{10}(2) [\text{dB}] \quad \text{Equation 2}$$

Herein, in all PDSCH transmission schemes except for the case of multi-user $\text{MIMO}_{power-offset=0}$, $P_A$ which is a UE-specific parameter, is delivered to the UE through higher layer signaling. $P_A$ may have one of values shown in Table 3.

TABLE 3

| | Value |
|---|---|
| $P_A$ | 3 dB, 2 dB, 1 dB, 0 dB, −1.77 dB, −3 dB, −4.77 dB, −6 dB |

Meanwhile, $\rho_A$, $\rho_B$ and $P_B$ are related to each other as shown in Table 4. Herein, $P_B$, which is a cell-specific parameter, is delivered to the UE through higher layer signaling.

TABLE 4

| | $\rho_B/\rho_A$ | |
|---|---|---|
| $P_B$ | Single antenna port | Two and Four antenna ports |
| 0 | 1 | 5/4 |
| 1 | 4/5 | 1 |
| 2 | 3/5 | 3/4 |
| 3 | 2/5 | 1/2 |

According to Table 4, the UE may know $\rho_B$ from $\rho_A$ and $P_B$ given by Equation 2.

Enhanced PDCCH (EPDCCH)

In LTE after Release 11, an enhanced-PDCCH (EPDCCH) which can be transmitted through the existing PDSCH region is considered as a solution to lack of capacity of a PDCCH caused by coordinated multi-point (CoMP), multiuser-multiple input multiple output (MU-MIMO), and the like and degradation of PDCCH performance caused by inter-cell interference. In addition, for the EPDCCH, channel estimation may be performed based on DMRSs in order to obtain a pre-coding gain, in contrast with the case of the legacy CRS-based PDCCH.

Figure 8:
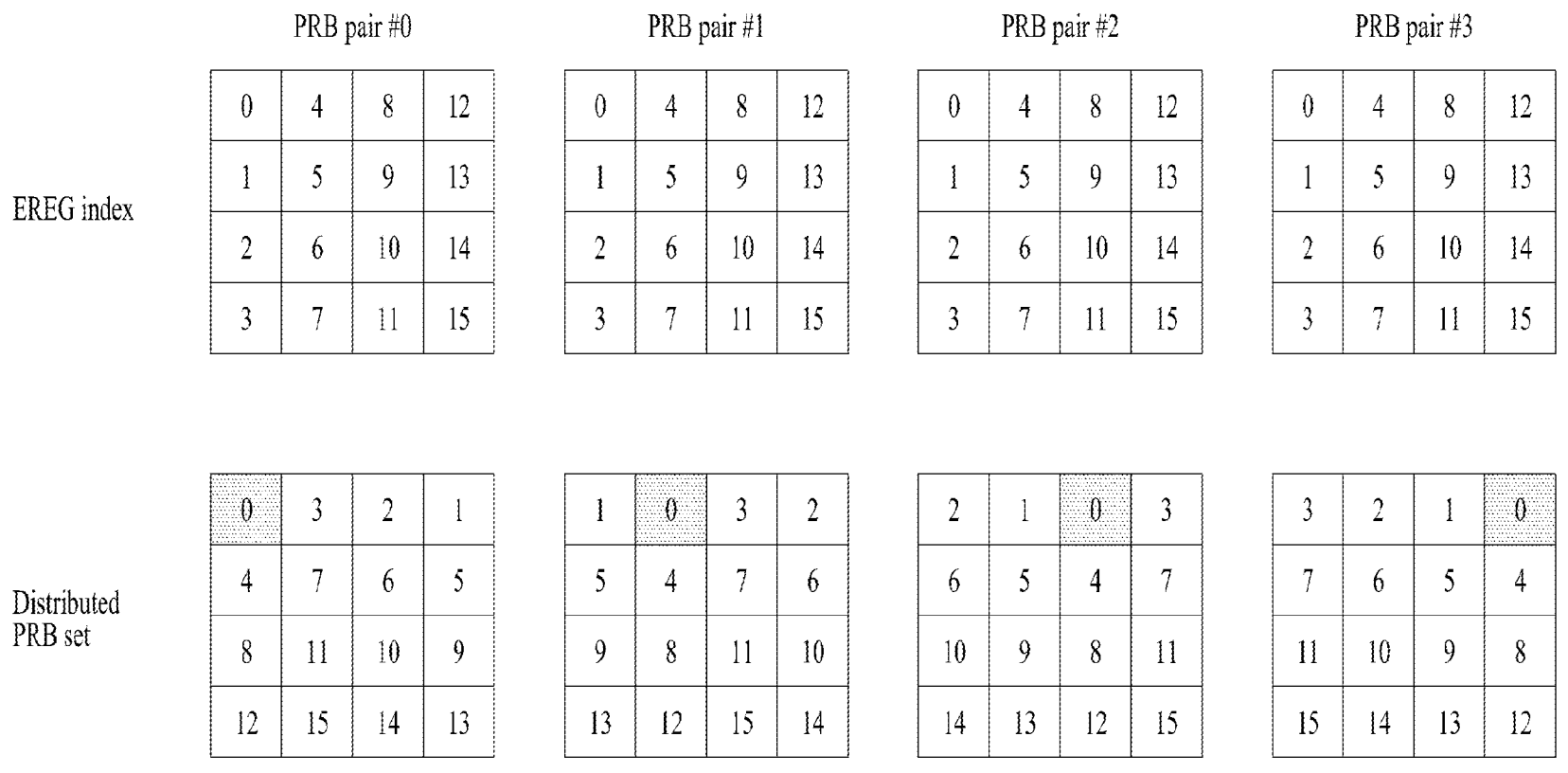

EPDCCH transmission may be divided into localized EPDCCH transmission and distributed EPDCCH transmission according to configuration of a physical resource block (PRB) pair used for EPDCCH transmission. Localized EPDCCH transmission represents a case in which resource sets used for transmission of an EPDCCH neighbor each other in the frequency domain, and may adopt precoding to obtain a beamforming gain. For example, localized EPDCCH transmission may be based on consecutive ECCEs the number of which corresponds to an aggregation level. On the other hand, distributed EPDCCH transmission represents transmission of an EPDCCH in PRB pairs separated in the frequency domain, and has a gain in terms of frequency diversity. For example, distributed EPDCCH transmission may be based on an ECCE having four EREGs included in each of PRB pairs separated in the frequency domain. One or two EPDCCH (PRB) sets may be configured for a UE through higher layer signaling, and each EPDCCH PRB set may be intended for one of localized EDPCCH transmission and distributed EPDCCH transmission. When two EPDCCH PRB sets are given, the two sets may partially/fully overlap each other An eNB may transmit control information by mapping the control information to REs of EREGs for EPDCCH from one or more EPDCCH PRB sets. Herein, the EREGs are used to define mapping of a control channel to REs, and one PRB pair may include 16 EREGs (EREGs 0 to 15). 4 EREGs (or 8 EREs in some cases) may constitute one ECCE, and x ECCEs (x being one of 1, 2, 4, 8, 16, and 32) may constitute one EPDCCH. In the case of distributed EPDCCH transmission, EREGs present in multiple PRB pairs may constitute one ECCE to ensure diversity. More specifically, in the case of distributed EPDCCH transmission EREG-to-ECCE mapping (hereinafter, a first ECCE number-EREG number-PRB number relationship) may indicate that an ECCE index in an EPDCCH PRB set may correspond to EREG index $\lfloor n/N_{RB}^{X_m} \rfloor + jN_{ECCE}^{RB}$ in PRB pair index $(n+j \max(1, N_{RB}^{X_m}/N_{EREG}^{ECCE}))$. Herein, n denotes the ECCE number, $N_{RB}^{X_m}$ denotes the number of PRB pairs included in an EPDCCH set Xm, $N_{EREG}^{ECCE}$ denotes the number of EREGs per ECCE, ECCE denotes the number of ECCEs per PRB pair, and $j=0, 1, \ldots, N_{EREG}^{ECCE}-1$. For example, according to the first ECCE number-EREG number-PRB number relationship, when 4 PRB pairs are included in an EPDCCH PRB set, ECCE index 0 includes EREG 0 of PRB pair 0, EREG 4 of PRB pair 1, EREG 8 of PRB pair 2, and EREG 12 of PRB pair 4. The EREG-to-ECCE mapping relationship is illustrated in FIG. 8.

The UE may perform blind decoding as in a legacy LTE/LTE-A system to receive/acquire DCI over an EPDCCH. More specifically, the UE may attempt to decode (or monitor) a set of EPDCCH candidates at each aggregation level, for DCI formats corresponding to set transmission modes. Herein, the set of EPDCCH candidates subjected to monitoring may be referred to as an EPDCCH UE-specific search space. The search space may be set/configured for each aggregation level. In addition, the aggregation levels may be {1, 2, 4, 8, 16, 32} according to the type of a subframe, the length of a CP, and the amount of available resources in a PRB pair, compared to the case of a legacy LTE/LTE-A system.

For a UE for which an EPDCCH is configured, REs included in PRB pairs may be indexed by EREGs, and the EREGs may in turn be indexed in units of ECCEs. EPDCCH candidates configuring the search space may be determined based on the indexed ECCEs and then blind decoding may be performed. Thereby, control information may be received.

Upon receiving the EPDCCH, the UE may transmit ACK/NACK for the EPDCCH over the PUCCH. The index of a resource, i.e., a PUCCH resource may be determined by the lowest ECCE index among the ECCE indexes used for transmission of the EPDCCH. That is, the index may be expressed as Equation 3 given below.

$$n_{PUCCH\text{-}ECCE}^{(1)} = n_{ECCE} + N_{PUCCH}^{(1)} \qquad \text{Equation 3}$$

In Equation 3, $n_{PUCCH\text{-}ECCE}^{(1)}$ is the index of a PUCCH resource, $n_{ECCE}$ is the lowest ECCE index among the ECCE indexes used in transmitting the EPDCCH, and $N_{PUCCH}^{(1)}$ (which may be replaced by $N_{PUCCH,EPDCCH}^{(1)}$), which is a value delivered through higher layer signaling, represents the point where the PUCCH resource index starts.

If PUCCH resource index is determined solely by Equation 2, resource collision may occur. For example, if two EPDCCH PRB sets are configured, ECCE indexing is independently conducted in each EPDCCH PRB set, and thus the lowest ECCE indexes of the EPDCCH PRB sets may be equal. This problem may be addressed by setting different start points of the PUCCH resources for different users. However, setting the start point of the PUCCH resource differently for every user results in reservation of many PUCCH resources and is thus inefficient. In addition, DCI of multiple users may be transmitted over the EPDCCH at the same ECCE location as in the case of MU-MIMO, and therefore there is also a need for a method for allocation of PUCCH resources considering the aforementioned case. To address the problem as described above, HARQ-ACK Resource Offset (ARO) has been introduced. ARO allows avoidance of PUCCH resource collision by shifting the PUCCH resources, which are determined by the lowest ECCE index of the ECCE indexes configuring an EPDCCH and the start offsets of the PUCCH resources conveyed through higher layer signaling, to a predetermined extent. ARO is indicated by 2 bits in DCI formats 1A/1B/1D/1/2A/2/2B/2C/2D transmitted over the EPDCCH, as shown below in Table 5.

TABLE 5

| ACK/NACK Resource offset field in DCI format 1A/1B/1D/1/2A/2/2B/2C/2D | $\Delta_{ARO}$ |
|---|---|
| 0 | 0 |
| 1 | −1 |
| 2 | −2 |
| 3 | 2 |

An eNB designates one of the ARO values in Table 2 for a specific UE, and then announces, to the specific UE, an ARO to use in determining a PUCCH resource, through a DCI format. The UE may detect an ARO field in the DCI format thereof and transmit a reception acknowledgement through a PUCCH resource determined using the detected value of the field.

For transmission of an EPDCCH as described above, a problem may occur in an interference situation in relation to neighboring cells. For example, for a UE receiving the PDSCH from a serving cell through a specific PRB pair, if a neighboring cell transmits EPDCCH through the same specific PRB pair, different interference properties may be given to respective ECCEs (or EREGs) even in one PRB pair. In view of a UE belonging to a neighboring cell receiving the EPDCCH, the (precoded) PDSCH of the serving cell may apply significant interference. Hereinafter, methods to solve this interference problem will be discussed.

Embodiment 1

According to an embodiment of the present disclosure, EPDCCH transmission may be performed through resources determined through cooperation/coordination with a neighboring transmission point. Herein, cooperation/coordination may be implemented in a manner that each transmission point recommends a resource (in a PRB pair (set) unit, an ECCE (set) unit, an EREG (set) unit, or the like) usable for the EPDCCH to a neighboring transmission point. More specifically, a first transmission point may configure a predetermined frequency resource region in at least one subframe in the time domain, and transmit information related to this frequency resource region to a second transmission point which is a neighboring cell. Herein, the predetermined frequency resource region may be a region use of which is recommended/suggested to the second transmission point for the EPDCCH or a region where the first transmission point ensures low interference. Specifically, the first transmission point may configure low downlink transmit power in the predetermined frequency resource region (namely, perform transmission with low transmit power) (Alternatively, a UE having a little influence on the second transmission point may be scheduled to lower interference with the second transmission point.) In other words, if the first transmission point transmits the PDSCH in the predetermined frequency resource region, PDSCH EPRE-to-(C)RS EPRE in the frequency resource region may have a smaller value than PDSCH EPRE-to-(C)RS EPRE in the resource region other than the frequency resource region. Alternatively, the predetermined frequency resource region may be nulled. In this case, the first transmission point may signal execution of rate matching in the predetermined frequency region to the UE (through, for example, higher layer signaling).

In the description above, the first transmission point may configure the predetermined frequency resource region in at least one subframe in the time domain. Herein, the at least one subframe i) may be configured directly by the first transmission point or ii) may be indicated in the information received from the second transmission point. More specifically, when the first transmission point configures a frequency resource region, the first transmission point may also configure a subframe to which the frequency resource region is applied. In this case, frequency resource region-related information which the first transmission point transmits to the second transmission point may include information related to the configured subframe. Alternatively, the second transmission point may transmit a predetermined time region (a subframe (set) that the second transmission point will use for EPDCCH transmission or a subframe (set) which the second transmission point indicates as an EPDCCH monitoring set to UEs belonging to the second transmission point) to the first transmission point, and the first transmission point may in turn configure the predetermined frequency region for the predetermined time region.

The first transmission point may configure the predetermined frequency resource region based on the results of measurement from UEs. More specifically, after the first transmission point receives reports on neighboring cell measurement results from the UEs belonging thereto, the first transmission point may allocate the predetermined frequency resource region to UEs which are less influenced by the second transmission point or UEs (belonging to the first transmission point) applying low interference to the second transmission point. For example, the first transmission point may allocate the predetermined frequency resource region to a UE (UE1 in FIG. 9) which is spaced from the cell edge of the second transmission point by a distance greater than or equal to a preset distance.

The first transmission point may configure a predetermined frequency resource region and signal the predetermined frequency resource region to the UEs belonging thereto. In addition, the first transmission point may signal transmit power allocation information (e.g., PDSCH EPRE-to-(C)RS EPRE) used in the predetermined frequency resource region to the UEs belonging thereto.

As another example, the first transmission point may transmit a specific signal (e.g., CRS (port), TRS, DMRS (CDM group, port), etc.) for a specific purpose (e.g., backward compatibility) in the predetermined frequency resource region, and relevant information may be predetermined or transmitted through X2 signaling. For example, the first transmission point may signal, to the second transmission point, that CRS port 0 performs transmission with normal power. Upon receiving this signaling, the second transmission point may notify the UEs belonging thereto that the corresponding RE is rate-matched or punctured.

Subsequently, once the second transmission point receives, from the first transmission point, the information related to the predetermined frequency resource region, the second transmission point may use some of the frequency resource region for EPDCCH. In this case, the EPDCCH is intended for at least one of UEs (e.g., UE3 and UE4 in FIG. 9) positioned close to the cell edge of the first transmission point and second transmission point. The information related to the predetermined frequency resource region may include valid period information. That is, the frequency resource region recommended/suggested by the first transmission point may be valid only in a time period corresponding to the valid period information (or the first transmission point ensures low interference within the period), and the second transmission point may allocate the EPDCCH to the frequency resource region within the range of the valid period.

The second transmission point does not need to use the predetermined frequency resource region received from the first transmission point for EPDCCH transmission. That is, the predetermined frequency resource region indicated by the predetermined frequency resource region-related information transmitted from the first transmission point is simply a recommended/suggested region, and the second transmission point may compare the transmitted information with a region proper for EPDCCH transmission that the second transmission point has derived based on a channel state reported thereto or channel state that the second transmission point has measured. If the two regions are (significantly) different as a result of comparison, the second transmission point may feedback, to the first transmission point, one resource region that the second transmission point prefers (or a region determined to be proper for EPDCCH transmission). (In this case, the second transmission point may demand a specific region in a combination of the time domain and the frequency domain, or may demand a desired region in the frequency domain if an EPDCCH monitoring set is determined in the time domain.) Alternatively, in order to enhance resource utilization by the first transmission point, the second transmission point may feedback a resource region which the second transmission point actually uses between the frequency resource regions signaled by the first transmission point. For example, the first transmission point may recommend a specific PRB pair set for a subframe set in which the EPDCCH delivered by the second transmission point is transmitted, and the second transmission point may signal the PRB pair set, as an EPDCCH set, to UEs belonging to the second transmission point and significantly affected by the first transmission point. As another example, if the first transmission point recommends an ECCE set for EPDCCH use, the second transmission point may use the recommended ECCE set for localized or distributed EPDCCH according to configuration of the ECCE set, and signal, to the first transmission point, the EPDCCH transmission scheme for which the ECCE set is used (The first transmission point may signal, to a UE assigned a region including the ECCE set for PDSCH use, that rate matching has been performed in the region (or puncturing needs to be performed). In this case, the first transmission point may signal a rate matching pattern to the UEs belonging thereto in the same manner as for "a specific ECCE of a specific PRB pair"). In addition, the second transmission point may transmit, to the first transmission point, signing for making a request to the first transmission point for a specific resource for a specific EPDCCH transmission scheme or a specific region (which may include both time domain resources and frequency domain resources). This operation may be performed even before signaling of a recommended resource for EPDCCH is received from the first transmission point. For example, the second transmission point may ask for a region for only distributed EPDCCH (Additionally, the second transmission point may request a desired transmission scheme and a region desired when the scheme is used).

Figure 9:
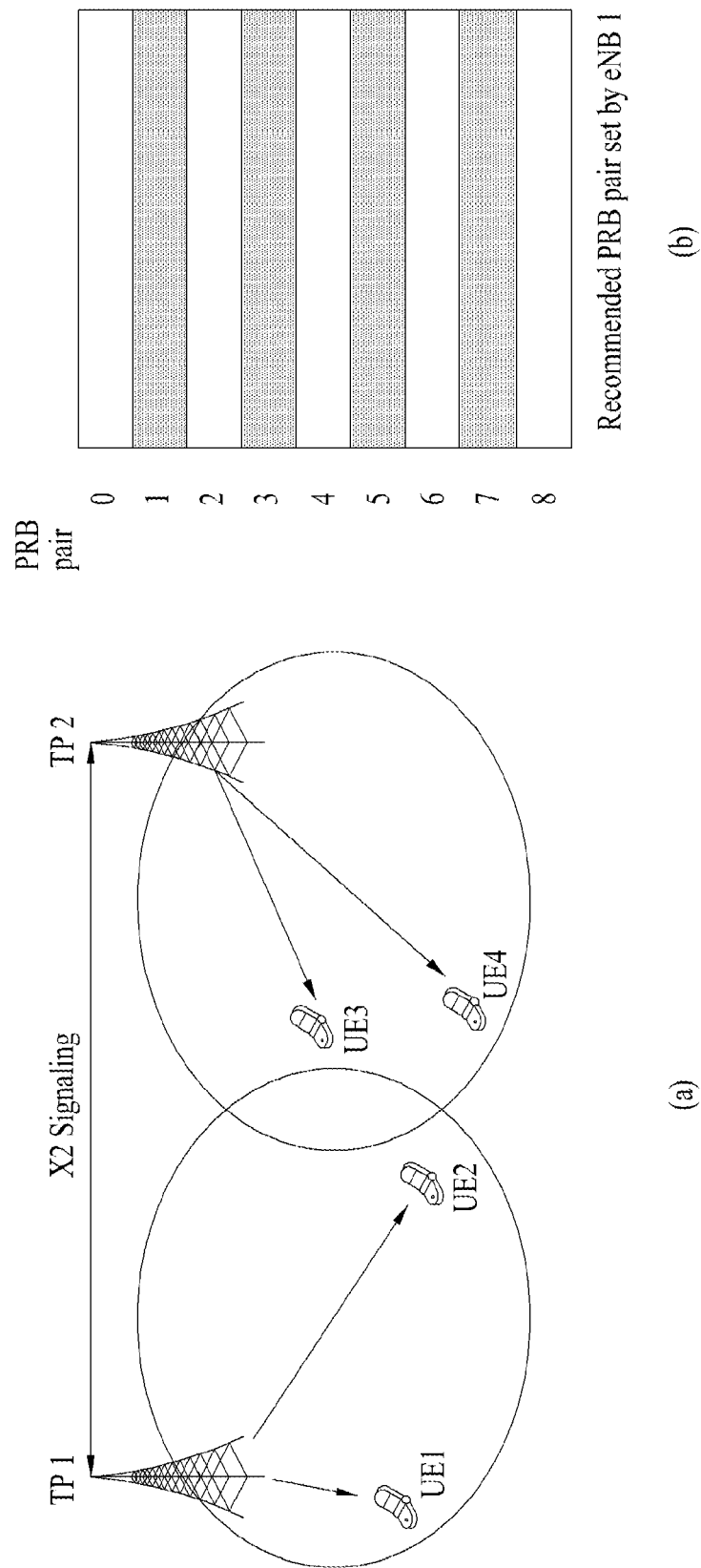
FIGS. 9 to 11 illustrate an embodiment of the present invention.

FIG. 9 shows a specific example of the first embodiment described above. Referring to FIG. 9, the second transmission point (TP2) may signal, to the first transmission point (TP1), a subframe set to be used as an EPDCCH monitoring set. In the subframe set, the first transmission point may configure resources (the shaded portions of PBR pairs 1, 3, 5 and 7 in FIG. 9(b)) recommended for EPDCCH transmission of the second transmission point and signal the same to the second transmission point. The second transmission point may use the resources recommended by the first transmission point as an EPDCCH (PRB) set for UE3 and UE4. Alternatively, the first transmission point may feedback a proper region for EPDCCH (e.g., some or all of PRB pairs 0, 2, 4 and 6 in FIG. 9(b)) for UE3 and UE4 based on measurement reports from UE3 and UE4. As another method to adapt the region recommended by the first transmission point to the situation of the second transmission point (load distribution, change state, etc.) different from the aforementioned method of the second transmission point signaling a subframe set, the first transmission point may recommend multiple regions/candidates, and the second transmission point may select a specific region/candidate from among the recommended regions/candidates and feedback the same. For example, the second transmission point may deliver subframe set information that serves (or is to serve) as an ABS (or MBSFN), and the first transmission point may exclude the corresponding subframe set.

Embodiment 1-1

The method for recommending a predetermined frequency resource described in Embodiment 1 may also be applied to CoMP. That is, in CoMP operation, each transmission point may configure a predetermined frequency resource region for other transmission points in the CoMP cluster (set). For example, in Embodiment 1, if the second transmission point (TP1) belongs to the CoMP cluster, the second transmission point may configure a predetermined frequency resource region for a third transmission point (a transmission point belonging to the CoMP cluster), which is similar to the operation of the first transmission point. In this case, a UE in the CoMP cluster may recognize predetermined frequency resource regions configured by the respective transmission points through resource mapping information. More specifically, in CoMP, a UE capable of received signals from multiple transmission points may recognize large-scale properties (e.g., received timing, received power, frequency shift, Doppler spread, delay spread, etc.) of each transmission point through QCL (quasi co-location) information. In addition, the UE receives rate matching information associated with the QCL information. The rate matching information includes resource mapping information. Information on the predetermined frequency resource regions configured by the (respective) transmission points is delivered to the UE through the resource mapping information. For details of the predetermined frequency resource region, refer to Embodiment 1.

Figure 10:
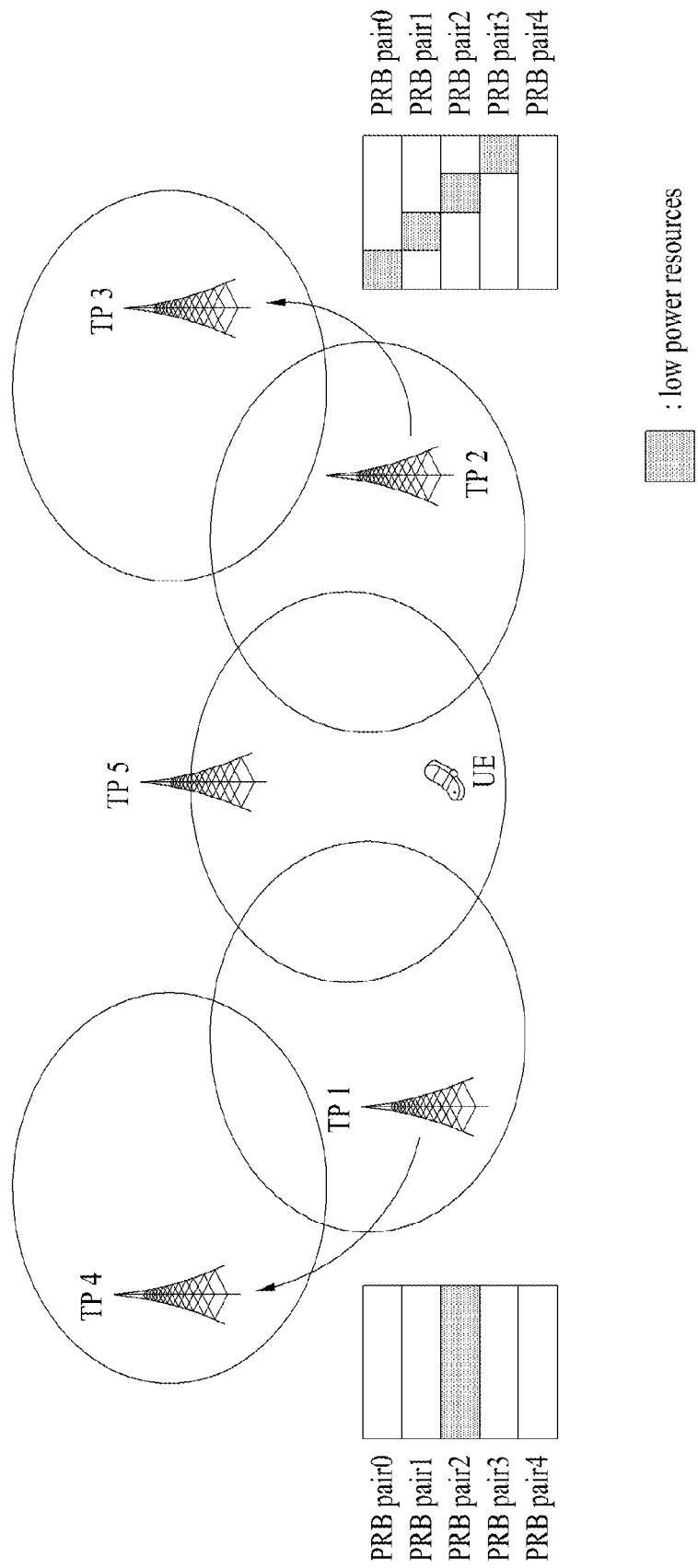

FIG. 10 shows an example of Embodiment 1-1. In FIG. 10, the first transmission point (TP1) may configure a predetermined frequency resource region, indicated by a shade area, for a fourth transmission point (TP4), and the second transmission point (TP2) may configure a predetermined frequency resource region, indicated by shaded areas, for the third transmission point (TP3) (namely, the first and second transmission points may perform transmission using low power in the shaded regions or null the regions). If transmission is performed between a UE belonging to TP5 and TP2 or TP1, rate matching information related to transmission and reception with the corresponding transmission point may include predetermined frequency resource region information (e.g., low power transmission information) which each transmission point configures for the other transmission point (Herein, rate matching information may be transmitted from TP0). For example, if the UE is assigned PRB pair 1 and PRB pair 2 for PDSCH use (by the first transmission point), the entirety of PRB pair 2 may be assumed to be rate-matched (namely, it may be assumed that PRB pairs 1 and 2 are allocated, but PDSCH transmission is actually performed only on PRB pair 1) when PDSCH is transmitted from TP1, and the shaded portions in PRB pair 1 and PRB pair 2 may be assumed to be rate-matched when PDSCH is transmitted from TP2. Alternatively, it may be assumed that each region is transmitted with a lower power than another assigned region. This may mean that transmission using different powers is possible within the resource region assigned to the UE.

Embodiment 2

Figure 11:
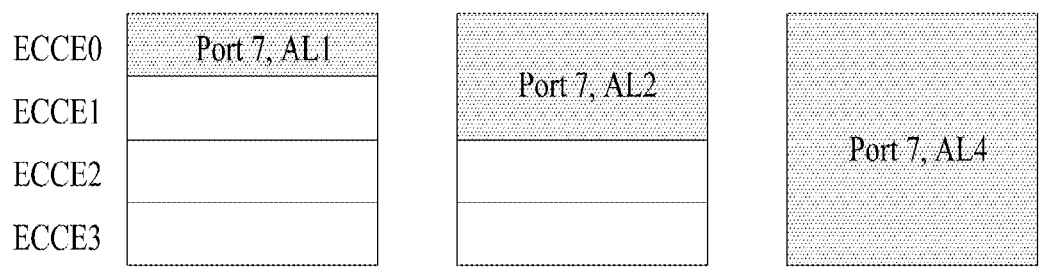

As another method to solve the interference problem, interference cancellation may be adopted. According a conventional method for interference cancellation, reference signal information of a dominant interferer is delivered to the UE, and the UE uses this reference signal information to estimate a channel coefficient of the dominant interferer to form a receiver beam. This method is difficult to apply when EPDCCH serves as interference, and a resource on which the EPDCCH is transmitted is indistinguishable. Since the EPDCCH is transmitted in an ECCE unit or EREG unit rather than in a PRB pair unit, it may be difficult to determine a resource region in which signal transmission is performed by a specific antenna port. For example, if a UE recognizes DMRS port 7 as reference signal information, it may be difficult to specify a resource on which the EPDCCH is actually transmitted. When DMRS port 7 is used as a representative antenna port, possible EPDCCH transmission resources may come in three aggregation levels 1, 2 and 4 as shown in FIG. 11. To handle this case, the UE may perform interference cancellation for only one ECCE associated with a detected/signaled DMRS port. Alternatively, a transmission point transmitting the EPDCCH may signal, to a neighboring transmission point, whether EPDCCH transmission is performed on a specific resource and a lowest aggregation level on the specific resource.

If the lowest aggregation level value is 2 or 4, interference cancellation may be performed for a region corresponding to 50% or 100% of the corresponding PRB pair, and thus more efficient operation may be expected. In addition, EPDCCH transmission which may serve as significant interference to a neighboring cell is very likely to be EPDCCH transmission to a UE present at the boundary between the cell and a serving cell, and therefore the lowest aggregation level value may be relatively high, and thus improvement of interference cancellation performance may be expected (in some cases, a transmission point transmitting EPDCCH transmission-related information may deliver a lowest aggregation level for multiple resource regions).

Figure 12:
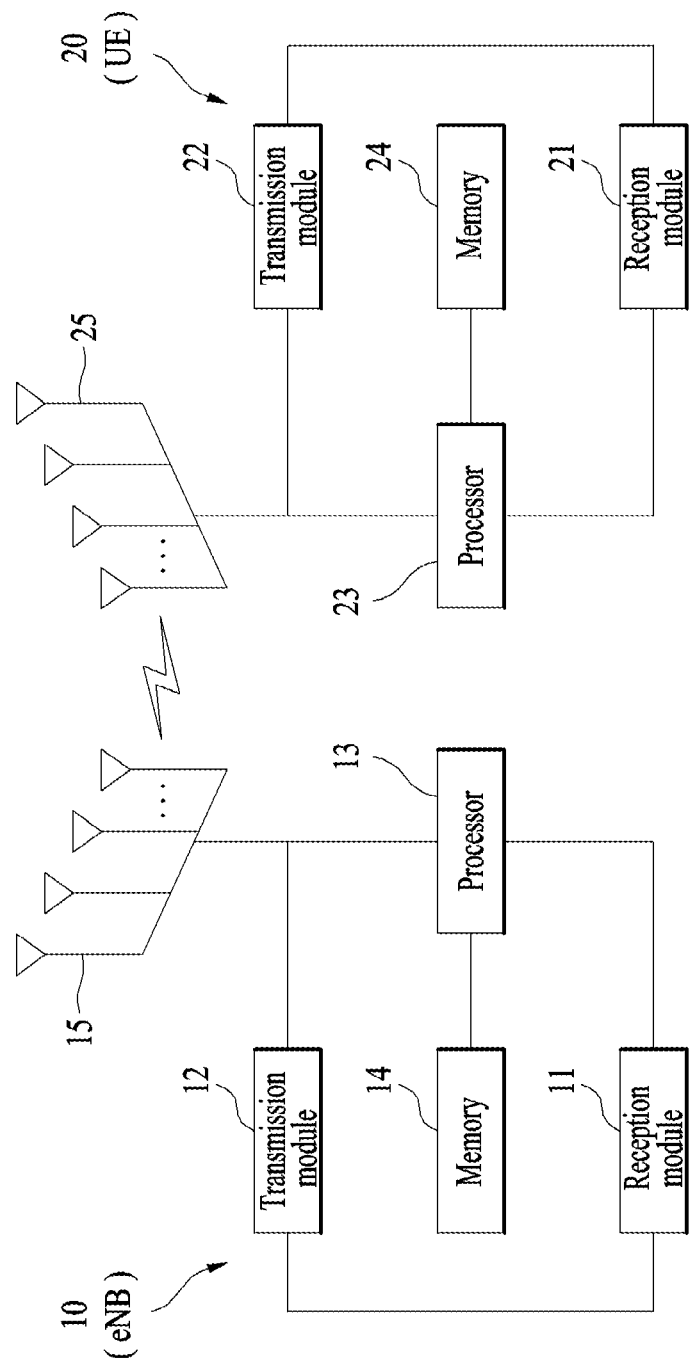
FIG. 12 is a diagram illustrating configuration of transceivers.

Configuration of Apparatuses According to One Embodiment of the Present Invention FIG. 12 is a diagram illustrating configurations of a transmit point and a UE according to one embodiment of the present invention.

Referring to FIG. 12, a transmission point 10 may include a reception module 11, a transmission module 12, a processor 13, a memory 14, and a plurality of antennas 15. The antennas 15 represent a transmission point that supports MIMO transmission and reception. The reception module 11 may receive various signals, data and information from a UE on uplink. The transmission module 12 may transmit various signals, data and information to a UE on downlink. The processor 13 may control overall operation of the transmission point 10.

The processor 13 of the transmission point 10 according to one embodiment of the present invention may perform processing operations necessary for the embodiments described above.

Additionally, the processor 13 of the transmission point 10 may function to computationally process information received by the transmission point 10 or information to be transmitted to the outside, etc. The memory 14, which may be replaced with an element such as a buffer (not shown), may store the computationally processed information for a predetermined time.

Referring to FIG. 12, a UE 20 may include a reception module 21, a transmission module 22, a processor 23, a memory 24, and a plurality of antennas 25. The antennas 25 mean that the UE supports MIMO transmission and reception. The reception module 21 may receive various signals, data and information from an eNB on downlink. The transmission module 22 may transmit various signals, data and information to the eNB on uplink. The processor 23 may control overall operation of the UE 20.

The processor 23 of the UE 20 according to one embodiment of the present invention may perform processing operations necessary for the embodiments described above.

Additionally, the processor 23 may function to computationally process information received by the UE 20 or information to be transmitted to the outside, and the memory 24, which may be replaced with an element such as a buffer (not shown), may store the computationally processed information for a predetermined time.

The configurations of the transmission point and the UE as described above may be implemented such that the above-described embodiments are independently applied or two or more thereof are simultaneously applied, and description of redundant parts is omitted for clarity.

Description of the transmission point 10 in FIG. 12 may also be applied to a relay which serves as a downlink transmitter or an uplink receiver, and description of the UE 20 may be equally applied to a relay which serves as a downlink receiver or an uplink transmitter.

The embodiments of the present invention may be implemented through various means, for example, hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to cover the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention as described above are applicable to various mobile communication systems.

What is claimed is:

1. A method for reducing interference in a wireless communication system, the method performed by a first base station and comprising:
configuring a frequency resource region in at least one subframe and a downlink transmission power in the frequency resource region;
transmitting, to a second base station, information indicating the configured frequency resource region; and
transmitting, to a first User Equipment (UE), a Physical Downlink Shared Channel (PDSCH) in the frequency resource region using the downlink transmission power,
wherein the downlink transmission power is configured by a PDSCH EPRE (Energy Per Resource Element)-to-CRS(Cell-specific reference signal) EPRE ratio for the frequency resource region which has a smaller value than a PDSCH EPRE-to-CRS EPRE ratio for a second frequency resource region in the at least one subframe,
wherein the second frequency resource region is a resource region other than the frequency resource region, and
wherein the information indicating the frequency resource region is used for transmitting an Enhanced Physical Downlink Control Channel (EPDCCH) to a second UE from the second base station.

2. The method according claim 1, wherein the frequency resource region is allocated to the second UE positioned within neighboring cell edges of the first and the second base station.

3. The method according claim 1, wherein the frequency resource region is nulled by the first base station.

4. The method according claim 1, wherein the frequency resource region is allocated to the first UE spaced from a cell edge of the second base station by a distance greater than or equal to a predetermined distance and positioned within coverage of the first base station.

5. The method according claim 1, wherein the at least one subframe is indicated by information received from the second base station.

6. The method according claim 1, wherein the information indicating the frequency resource region includes valid period information of the frequency resource region.

7. The method according claim 1, wherein the valid period information is used for allocating to the frequency resource region.

8. The method according claim 1, further comprising:
receiving, from the second base station, information on a part of the frequency resource region to be used for the EPDCCH.

9. The method according claim 1, wherein the first base station and a third base station are included in a Coordinated Multi-Point (CoMP) cluster, and
wherein the third base station configures a third frequency resource region in at least one subframe for the third base station and a second downlink transmission power in the third frequency resource region.

10. The method according claim 9,
wherein the third base station transmits, to a third UE, a Physical Downlink Shared Channel (PDSCH) in the third frequency resource region using the second downlink transmission power,
wherein the third UE, is served by the first base station or the third base station, and belongs to the CoMP cluster.

11. The method according claim 10, wherein the information indicating the frequency resource region and the information indicating the third frequency resource region are signaled to the third UE.

12. The method according claim 1, wherein the frequency resource region is configured in a PRB pair unit.

13. A first base station in a wireless communication system, comprising:
a reception module; and
a processor,
wherein the processor:
configures a frequency resource region in at least one subframe and a downlink transmission power in the frequency resource region,
transmits, to a second base station, information indicating frequency resource region, and
transmits, to a first User Equipment (UE), a Physical Downlink Shared Channel (PDSCH) in the frequency resource region using the downlink transmission power,
wherein the downlink transmission power is configured by a PDSCH EPRE (Energy Per Resource Element)-to-CRS (Cell-specific reference signal) EPRE ratio for the frequency resource region which has a smaller value than a PDSCH EPRE-to-CRS EPRE ratio for a second frequency resource region in the at least one subframe,
wherein the second frequency resource region is a resource region other than the frequency resource region, and
wherein the information indicating the frequency resource region is used for transmitting an Enhanced Physical Downlink Control Channel (EPDCCH) to a second UE from the second base station.

* * * * *